United States Patent [19]
Friderich et al.

[11] Patent Number: 5,375,994
[45] Date of Patent: Dec. 27, 1994

[54] PISTON DRIVEN PIN CLOSURE NOZZLE ASSEMBLY

[75] Inventors: Raimund Friderich, Sasbach; Otto Männer, Bahlingen, both of Germany

[73] Assignee: Otto Männer, Bahlingen, Germany

[21] Appl. No.: 113,779

[22] Filed: Aug. 27, 1993

[51] Int. Cl.⁵ .............................. B29C 45/23
[52] U.S. Cl. .................. 425/562; 264/328.9; 425/564; 425/566; 425/570
[58] Field of Search ............... 425/562, 563, 564, 565, 425/566, 570; 264/328.9

[56] References Cited
U.S. PATENT DOCUMENTS
5,223,275  6/1993  Gellert ................... 425/564

FOREIGN PATENT DOCUMENTS
4-320820 11/1992  Japan .................... 425/564

Primary Examiner—Tim Heitbrink
Attorney, Agent, or Firm—Darby & Darby

[57] ABSTRACT

A pin closure nozzle for injection molding molds has several working pistons acting on the same closure pin. These working pistons are arranged on a common throughgoing piston rod. Each piston rides in its own chamber and the piston rod passes through and is slidingly guided in openings in the chamber floors. The piston rod thus has at least two sliding guides and is accordingly prevented from tilting.

23 Claims, 2 Drawing Sheets

PISTON DRIVEN PIN CLOSURE NOZZLE ASSEMBLY

FIELD OF THE INVENTION

The invention relates to a pin closure nozzle assembly with piston drive for injection molding molds, particularly for multiple molds. A closure pin is provided, in the feed path for the liquid molding material in the region of the transition into the injection molding path, and can be moved axially to and fro between a closure position and an open position. At the opposite end of the pin opposite the sealing region, there is a first movable drive piston for the pin which is arranged coaxially relative to the pin. A second drive piston is coaxial to the first drive piston and likewise acts on the closure pin. The piston drive for the closure pin is subjected to compressed air of low pressure, for example, of 4 to 6 bar.

Such a pin closure nozzle assembly with a multiple piston drive is known from German Patent Specification 3249486. Here, the piston rod of the first piston acts on the second drive piston. Each piston rod is guided in a through opening of the cylinder housing. For reasons of space, these guides for the piston rods cannot be long enough to exclude lateral tipping or distortion of the unit consisting of piston and piston rod. If any such tipping arises, the piston can distort in its cylinder so that, under certain circumstances, the pressure of the medium, particularly when this is a relatively low pressure compressed air supply, is insufficient to generate the necessary closing force at the closure end of the closure pin.

OBJECT OF THE INVENTION

It is a principal object of the invention to provide a pin closure nozzle assembly of the type described in which tilting of the piston rod is avoided.

GENERAL DESCRIPTION OF THE INVENTION

In accordance with the invention, the problem is solved in that the drive pistons which act on a closure pin are fixed to a con, non throughgoing piston rod. The piston rod passes through the floor of the cylinder chambers which contain the individual pistons and is slidably guided in through openings in the cylinder floors.

The invention allows the piston rod to have as many sliding guides as drive pistons and cylinder chambers. There are thus at least two guides for the piston rod so that tipping is practically excluded regardless of how the pistons are operated and guided in their cylinders.

It is particularly advantageous if the piston rod is constructed as an integral unit. If then has the best possible stability and in cooperation with at least two slide guides, prevents any sort of tilting which could lead to a distortion of the piston and a correspondingly large resistance against the pressure medium.

In accordance with one embodiment of the invention, the end of the piston rod most remote from the closure pin projects past the respective piston and is guided in the cylinder lid or casing. This guidance can be in addition to that in the cylinder floors or in place of the guidance in one of the cylinder floors. In this way, three guides can stabilize one and the same piston rod.

In accordance with a further embodiment of the invention, the likelihood of tipping or distortion can be reduced in that one of the drive pistons, particularly the drive piston most remote from the closure pin is of one piece with the piston rod. The guidance of this first piston at its cylinder wall can then serve to stabilise the entire drive unit. Additionally, this gives rise to a simplification of assembly because the piston does not need to be fixed to the piston rod with additional fixing means.

One or more drive pistons can be fixed on the piston rod axially with the aid of a spring ring or a Seeger ring. This also provides a simple assembly method.

It is particularly advantageous for the piston or pistons to be fixed or tensioned between an increased diameter section of the piston rod, on the one hand and a spring ring or a Seeger ring, on the other hand. For example, the increased diameter section can act on the upper side of a piston so that the pressing force for the closure process is transferred from a more remote to a less remote piston. The Seeger rings are then effective to open the closure pin. However, the arrangement can also be reversed.

For the feed of pressure medium, particularly compressed air, channels can be provided in the piston housing and in the cylinder walls and can debouch at the upper side of the piston. For the rearwards movement of the piston drive, channels for compressed medium or compressed air can run through the cylinder walls and open underneath the piston.

According to one embodiment of the invention, a third drive piston is arranged in its own sealed cylinder chamber disposed axially behind the other cylinder chambers. This permits a greater closing force to be achieved with relatively low supply pressure of compressed air so that, in appropriate circumstances, the radial dimensions of the piston drive can be diminished and correspondingly greater numbers of pin closure nozzles can be arranged in a narrower space close to one another.

The provision of several drive pistons allows several parallel piston rods, and accordingly several closure pins to be loaded simultaneously. This is made possible by the guidance of the piston rod at several guide positions and enables many small molded parts to be manufactured in a very narrow space.

In order for the good guidance of the piston rod to be transferred to the closure pin, one end of the closure pin fits coaxially in an aperture or bore of the piston rod and is positively but releasably fixed therein. In this fashion, the piston rod, which is secured against deviation by its good multiple guidance, can prevent excessive deflection of the closure pin even on lateral loading of the pin by inflowing molding material. The closure pin can, despite any one-sided loadings, be shifted into the closure position rapidly and precisely.

The bore can extend to the piston most remote from the pin and have an outwardly directed mouth from which the end of the closure pin is accessible. The closure pin can be disassembled and pulled out through the bore of the piston rod. The bore should be centrally and concentrically arranged in the piston rod. A damaged or worn closure pin can be disassembled replaced via the passage going through the piston rod without having to remove and open up the entire pin closure nozzle assembly. Replacement of the closure pins is thus simplified by the through passage in the piston rod and reduces downtimes during repair work.

In this connection, the bore in the piston rod can have a closure for the end thereof remote from the closure pin. The closure is preferably a screw closure, and the inwardly directed end face of the closure simultaneously constitutes an axial stop for the end of the closure pin. The piston rod which is moved to and fro can thus entrain the closure pin via its closure. If the closure is opened, the pin is accessible for disassembly.

The end face of the closure pin can have a bore with an undercut or thread. A pulling tool or screw can be inserted in the undercut or thread through the bore of the piston rod to pull out the closure pin axially through the piston rod.

In order for the closure pin to move in the opening direction during of the return movement of the piston and its piston rods, the closure pin can be coupled in or to the piston rod so as to be pulled back therewith. For example, the bore of the piston rod can have a narrow portion and a wide portion separated by a shoulder which abuts the closure pin.

The invention provides a pin closure nozzle assembly with a multiple piston drive in which, tilting of the piston rod, and thereby distortion of the pistons, is prevented. The number of drive pistons which act on the piston rod can be increased essentially without limit so that, even with relatively low pressure in the pressure medium, it is nevertheless possible to apply a large closure force. Under in appropriate circumstances, the large closure force permit the application of several parallel pistons directly against a drive piston and the simultaneous operation of several closure pins. Replacement of a closure pin is facilitated if this is mounted and can be removed, via a central bore of the piston rod. Such mounting and removal are not possible, with individual pistons and piston rods which are arranged one behind the other.

BRIEF DESCRIPTION OF THE DRAWINGS

Specific preferred embodiments of the invention are shown in the accompanying drawings but by way of example only and not with a view to limitation. Details of the embodiments will be described with reference to the drawings, in which.

In both of the differing embodiments illustrated, corresponding parts or parts whose function corresponds to one another have been provided with corresponding reference numbers, even when the parts themselves are constructed differently.

In addition, in both drawings, each closure pin is shown in retracted or open position, to one side of a respective center line and in sealing or closed position to the other side of the center line.

DESCRIPTION OF PREFERRED EMBODIMENTS

Figure 1:
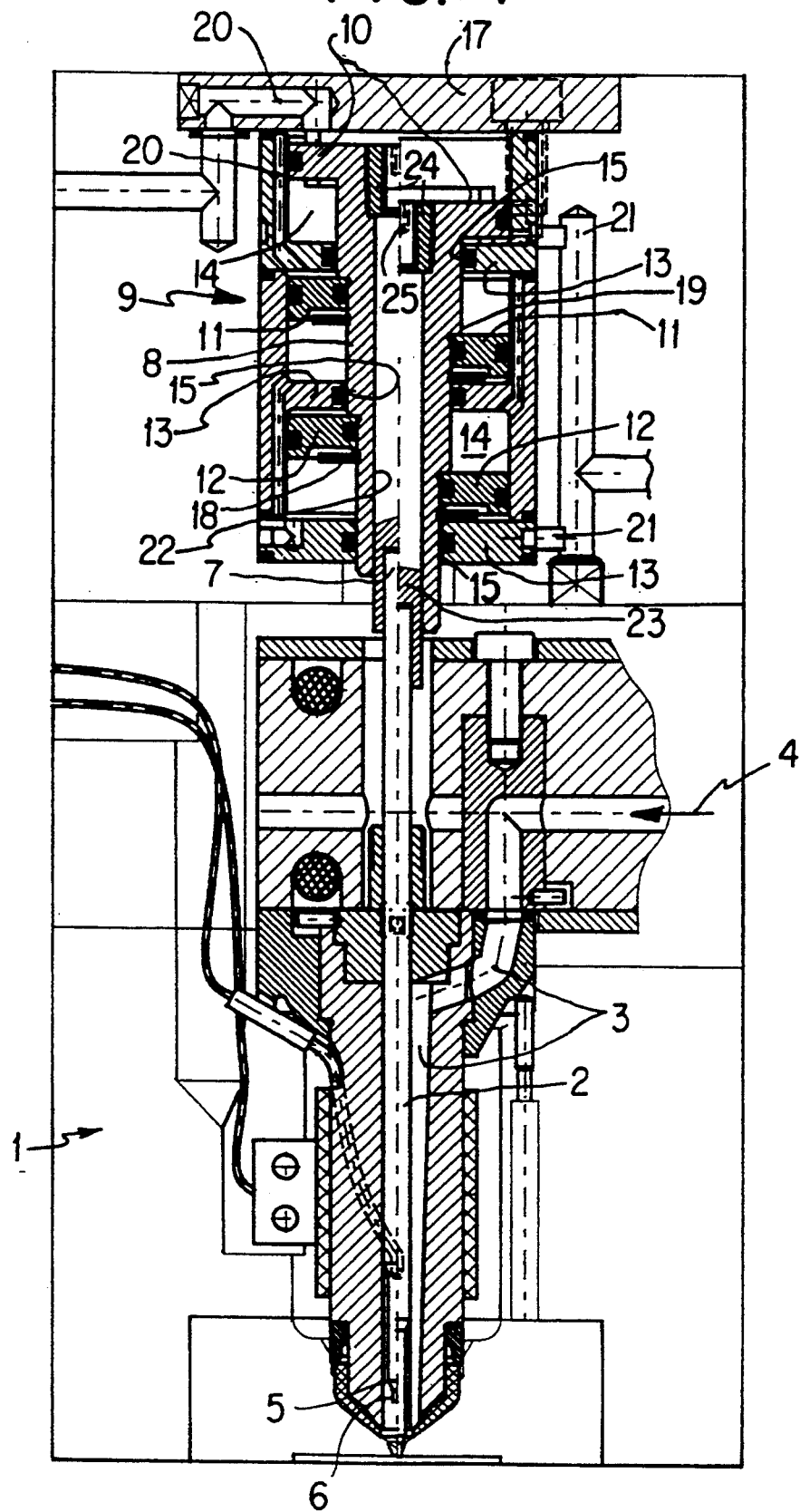
FIG. 1 is a longitudinal section through a pin closure nozzle having a piston drive with three pistons mounted on a common piston rod.
Figure 2:
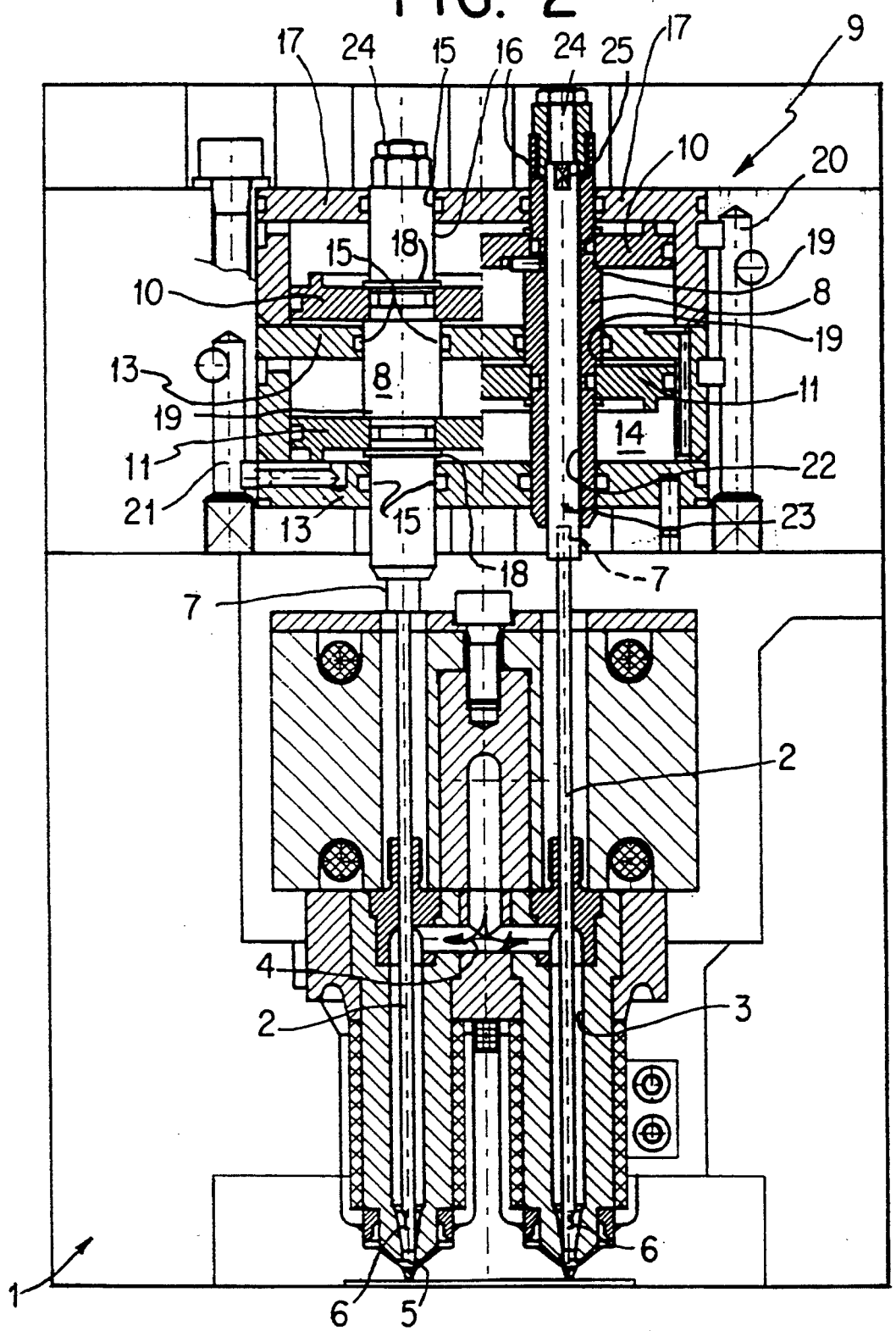
FIG. 2 is a longitudinal section through a multiple pin closure nozzle, in which each closure pin is activated by a piston rod, with two pistons.

Referring now to the drawings, a pin closure nozzle assembly is denoted generally by 1. This may have either a single closure pin 2 as shown in FIG. 1 or at least two closure pins 2 as shown in FIG. 2. Both embodiments serve in known fashion for filling injection molding molds, particularly multiple molds as in the case of FIG. 2, with molding material. An important part of the pin closure nozzle assembly 1, referred to hereinafter as nozzle 1, is accordingly the closure pin 2. This is arranged in the feed path 3 for the liquid molding material 4. It can be moved to and fro from an open position into a closure position and back. In the drawings, the left hand side of FIG. 1 shows the open position and the right hand side the closure position while in FIG. 2 the right hand side of the drawing shows the open position and the left hand side the closure position.

At its closure end 5, the closure pin 2 has a sealing region 6 of smaller diameter than its remaining portions.

The end 7 of the pin 2 opposite the sealing region 6 is engaged by a piston rod 8 of a piston drive denoted as a whole by 9. The piston drive has, coaxial to the closure pin 2, a first drive piston 10 and a second drive piston 11, which, both act on the closure pin 2.

In the embodiment of FIG. 1, a third drive piston 12 is arranged coaxially to the drive pistons 10 and 11. In contrast, in the embodiment of FIG. 2, only the two drive pistons 10 and 11 are provided.

Because of this multiple arrangement of pistons, the piston drive 9 for the closure pin 2 can be operated with compressed air at relatively low pressure, for example, 4 to 6 bars or in certain circumstances even as little as 3 bars but yet be able to provide an effective closing force at the closure end 5 of the closure pin 2.

In order that and one-sided loading of the closure pin 2 which can, in certain circumstances, arise from of the molding medium 4, will not cause tilting of the piston rod 8 and thereby distort the drive pistons 9, 10 and 11 so that they offer too great a resistance to the compressed air, the drive pistons 10, 11, 12 are fixed to a common, throughgoing piston rod 8. Each piston rod 8 passes through a floor 13 of the cylinder chamber 14 which contains the individual piston. The cylinder chambers 14 are arranged coaxially one behind the other in the feed direction. The piston rod 8 is slidingly guided in the through passage openings 15 in the floors 13. The piston rod 8 thus has good intrinsic stability and, since it is guided at several places, cannot be tilted even on some lateral loading.

One can see that in both of the exemplary embodiments the piston rod 8 has just as many sliding guides as drive pistons and cylinder chambers In FIG. 1, there are three drive pistons 10, 11 and 12 with corresponding cylinders 14. All of the cylinder floors 13 are provided with through openings 15 which serve as sliding guides for the common piston rod 8.

In the exemplary embodiment of FIG. 2, two drive pistons 10 and 11 and two cylinder chambers 14 are provided. The floors 13 of these cylinder chambers 14 likewise have the guiding through openings 15. In FIG. 2 the piston rod 8 has a projection 16 which projects which past the piston 10 lying furthest from the sealing pin 2 and this projection 16 is guided in the cylinder lid or closure 17 so that, in this case, there is one more sliding guide than there are pistons. However, the lowermost sliding guide can be omitted here if, for example, the closure pin itself is to project through the adjacent cylinder floor 13 into the neighboring cylinder chamber 14.

One can see that in both exemplary embodiments, the throughgoing piston rod it is constructed as an integral unit. This gives it a high intrinsic stability and allows it to take up and satisfactorily transfer the reaction forces stemming from the slide guide.

In this connection, a further measure for improving the guidance and stability is provided in the exemplary embodiment shown in FIG. 1. This consists in rendering the first drive piston 10 furthest removed from the closure pin 2 integral with the piston rod 8. Accordingly, the guidance of the drive piston 10 in its cylinder chamber 14 further stabilizes the entire piston drive 9 against tipping and distortion. In addition, assembly is simplified since the piston rod no longer needs to be connected to the piston by fixing means.

The other drive pistons 11 and 12 are fixed on the piston rod 8 in the axial direction with a spring ring or a Seeger ring 18. In this connection, it can be seen that one side of each piston 11 and 12 lies against an increased diameter section or shoulder 19 of the piston rod while the other side bears against the spring ring or Seeger ring 18. In other words, the pistons 11 and 12 are fixed or tensioned between the enlarged diameter section 19 and the fixing ring. It is particularly evident from FIG. 1 that, in the direct neighbourhood of the piston 10 furthest removed from closure pin 2, the diameter of the piston rod is at its largest. The diameter decreases at each further piston with attendant formation of a downward facing should 19. These shoulders 19 can also face upwards FIG. 2 shows that the piston rod 8 can have an increased diameter section with two shoulders 19 between the pistons 10 and 11. Each of the pistons 10 and 11 lies against one of the shoulders 19. The sides of the pistons 10 and 11 facing away from the shoulders 1a bear against a Seeger ring 18.

It is also evident from FIGS. 1 and that the of the pressure medium, generally low pressure compressed air, is fed into the piston housing and the cylinder walls via channels 20 opening at the upper side of the piston. Compressed air channels 21 running through the cylinder walls below the pistons are provided for return of the piston drive 9. The channels 21 open near the floors 13 in order that the pistons, which lie against the floors 13 in the closure position of the closure pin 2, can be retracted.

FIG. 1 shows a piston drive 9 having a total of three drive pistons 10, 11 and 12 which act on a single closure pin 2. In FIG. 2, on the other hand each of the drive pistons 10 and 11 loads several piston rods 8 arranged parallel to one another and accordingly simultaneously load several closure pins 2. Obviously more than two coaxial pistons could also be provided on each single piece piston rod 8 in FIG. 2. This is possible because the piston rods 8 as in the exemplary embodiment of FIG. 1, are respectively guided by several through openings 15 and/or have projecting portions 16 for guidance in cylinder closures 17. Accordingly, despite the relatively large ratio of piston surface to piston length, the piston rod is well guided and cannot be tilted even if the closure pins 2 which are actuated by it are loaded on one side by the molding material. In this manner, even closure pins which lie in a very narrow space can be driven by large forces, even if only compressed air at a relatively low pressure is available as a pressure medium. This means that closely spaced individual nozzles 1 as well as a multiple nozzle having several closure pins 2 can be actuated. An injection molding mold, e.g., for small parts can accordingly contain individual molds lying very close to one another and can nevertheless be filled precisely. The danger of damage associated with such a large number of closure pins 2, namely the danger of piston rod and drive piston distortion thus can be almost wholly eliminated in practice.

Because of the good stable guidance of the piston rod 8, it is possible to coaxially fit the pin end 7 of the closure pin 2 in a recess or bore 22 of the piston rod 8 and to positively but releasably fix the pin end 7 in the bore 22. In the exemplary embodiment of FIG. 1, an intermediate piece 23 is provided for this purpose.

One can, see that the bore 22, which in this case is centrally and concentrically arranged in the piston rod 8, extends above the piston 10 furthest removed from the pin 2. The bore 22 has an outwardly directed mouth from which the end 7 of the closure pin 2 can be reached so that the closure pin 2 can be pulled out through the bore 22 of the piston rod 8 and disassembled. Likewise, a new closure pin 2 can be inserted through this bore 22 if exchange of the closure pin is required for reasons of wear or because of damage. A complete, time-consuming disassembly of the pin closure nozzle 1 is accordingly avoided.

Furthermore, it is evident in both exemplary embodiments that the end of the bore 22 pin 2 is provided with a closure. The closure is here constructed as a threaded plug 24 having an inwardly directed end face which constitutes a direct or indirect stop for the end 7 of the closure pin 2. The intermediate body 23 is arranged, between this end 7 and the front face of the plug 24.

In this connection, the end of the closure pin, or the end of the intermediate body 23, facing the plug can have a bore 25 with and undercut or interior thread. Thus, following removal of the closure plug 24, a tool which fits in the bore 25 or its thread may be inserted in the bore 25 to pull out the intermediate body 23 the closure pin 2 in the axial direction of the piston rod 8. It is obvious that the closure pin 2 and/or the intermediate body 23 is linked to the piston rod in such a fashion that the closure pin and the intermediate body can follow case the to and fro movement of the piston rod 8 during normal operation. For example, a clamping seating would be sufficient although screw threading or the like could be provided if desired.

Overall, a very simple construction of the nozzle 1 is obtained in spite of the fact that a plurality of drive pistons are coaxially arranged one behind the other in order to achieve a substantial closure force despite low pressure in the pressure fluid medium. The throughgoing piston rod 8 with its multiple slide guidance stabilises the entire arrangement in such a fashion that not only two or three but even four pistons can be used. Alternatively the multiple pistons can simultaneously actuate several piston rods and closure pins 2. Despite the apparently increased mechanical requirements, very simple exchange of the closure pins 2 is possible because the piston rod 8 in each case is throughgoing and accordingly can have a throughgoing removal opening for the closure pin 2.

The pin closure nozzle 1 for injection molding molds has several coaxial drive pistons 10, 11, and optionally 12, which act on the same closure pin 2. These drive pistons are fixed to a common, particularly one-piece, piston rod 8 which is throughgoing and traverses the floors 13 of the cylinder chambers for the individual pistons. The piston rod 8 is slidingly guided in through openings 15 of the cylinder floors 13 so that the piston rod has at least two slide guides and is thereby secured against tilting.

I claim:

1. A nozzle for feeding molten material to an injection mold, comprising wall means defining a flow path for the molten material and at least two chambers spaced from said flow path, each of said chambers having a respective end wall with an opening therethrough, a valve member movable between a first position in which said flow path is open and a second position in which said flow path is closed; and operating means for said valve member, said operating means including an elongated actuating member for moving said valve member, and said actuating member extending through and being guided by said openings, said operating means further including a piston member in each of said chambers, and said piston members being connected to said actuating member so that said piston members are essentially fixed against relative movement longitudinally of said actuating member, wherein each of said openings has a peripheral surface and said actuating member directly contacts said peripheral surfaces.

2. The nozzle of claim 1, wherein said valve member is elongated and is movable in longitudinal direction thereof.

3. The nozzle of claim 1, wherein said valve member and said piston members are substantially coaxial.

4. The nozzle of claim 1, wherein the number of chambers, the number of piston members and the number of openings which receive and guide said actuating member are the same.

5. The nozzle of claim 1, wherein said actuating member is of one piece.

6. The nozzle of claim 1, wherein one of said end walls constitutes a closure for said chambers, said flow path being located on one side of said piston members and said one end wall being disposed on the opposite side of said piston members.

7. The nozzle of claim 1, wherein one of said piston members is of one piece with said actuating member.

8. The nozzle of claim 7, wherein said one piston member is more remote from said flow path than the remainder of said piston members.

9. The nozzle of claim 1, wherein at least one of said piston members is held fixed against axial movement relative to said actuating member using a spring ring or Seeger ring.

10. The nozzle of claim 9, wherein said spring ring or Seeger ring bears against one side of said one piston member, said actuating member having a shoulder which bears against the opposite side of said one piston member.

11. The nozzle of claim 1, wherein each of said piston members has a side facing away from said flow path, said chambers being connected to channel means for providing a pressurized working fluid, and said channel means opening to said sides of said piston members.

12. The nozzle of claim 1, wherein each of said piston members has a side facing said flow path, said chambers being connected to channel means for providing a pressurized working fluid, and said channel means opening to said sides of said piston members.

13. The nozzle of claim 1, wherein the number of said chambers and the number of said piston members is at least three.

14. The nozzle of claim 1, wherein said wall means defines at least one additional flow path for the molten material; and further comprising at least one additional valve member for said additional flow path, and at least one additional actuating member for said additional valve member, additional piston members being fixed to said additional actuating member.

15. The nozzle of claim 1, wherein said actuating member is provided with a passage, said valve member having an end portion which is receivable in said passage and is releasably connectible to said actuating member.

16. The nozzle of claim 15, wherein said passage extends longitudinally of said actuating member and has an open end remote from said flow path, said valve member being withdrawable from said passage through said open end.

17. The nozzle of claim 16, wherein said actuating member has a central axis and said passage is substantially coaxial with said actuating member.

18. The nozzle of claim 16, wherein said actuating member comprises a closure for said open end.

19. The nozzle of claim 18, wherein said closure is threaded.

20. The nozzle of claim 18, wherein said closure has an end face which confronts, and constitutes an abutment for, said end portion when said closure is mounted on said open end.

21. The nozzle of claim 16, wherein said end portion is provided with a coupling member engageable by a withdrawing tool.

22. The nozzle of claim 21, wherein said coupling means comprises an undercut or a thread.

23. The nozzle of claim 15, wherein said actuating member is reciprocable and said valve member is connectible to said actuating member so as to be reciprocable therewith.

* * * * *

UNITED STATES PATENT AND TRADEMARK OFFICE
CERTIFICATE OF CORRECTION

PATENT NO. : 5,375,994
DATED : December 27, 1994
INVENTOR(S) : Raimund FRIDERICH and Otto MÄNNER It is certified that error appears in the above-indentified patent and that said Letters Patent is hereby corrected as shown below:

Title page, [73] Assignee: "Otto Manner" should read --Otto Männer--.

Signed and Sealed this

Eighteenth Day of April, 1995

*Attest:*

BRUCE LEHMAN

*Attesting Officer*  *Commissioner of Patents and Trademarks*